United States Patent [19]

Ichiba et al.

[11] 4,167,305
[45] Sep. 11, 1979

[54] OPTICAL TRANSMISSION FIBER

[75] Inventors: Terumichi Ichiba; Munetaka Kawaguchi; Yutaka Yamamoto, all of Osaka, Japan

[73] Assignee: Sumitomo Electric Industries Ltd., Osaka, Japan

[21] Appl. No.: 878,101

[22] Filed: Feb. 15, 1978

Related U.S. Application Data

[63] Continuation of Ser. No. 480,174, Jun. 17, 1974, abandoned.

[51] Int. Cl.² .................................................. G02B 5/14
[52] U.S. Cl. .............................. 350/96.34; 350/96.31; 350/96.33; 427/163; 428/392
[58] Field of Search ............... 350/96.29, 96.30, 96.31, 350/96.32, 96.33, 96.34; 427/163; 385 A; 428/361, 378, 392, 395

[56] References Cited

U.S. PATENT DOCUMENTS

| | | | |
|---|---|---|---|
| 3,253,500 | 5/1966 | Hicks, Jr. ........................ 350/96 |
| 3,350,654 | 10/1967 | Snitzer ..................... 350/96.33 X |
| 3,434,774 | 3/1969 | Miller ............................. 350/96 |
| 3,458,615 | 7/1969 | Bracaw, Jr. et al. ................ 264/171 |
| 3,531,368 | 9/1970 | Okamoto et al. ............... 428/395 X |
| 3,549,233 | 12/1970 | Eaglesfield et al. ............. 350/96.33 |
| 3,556,635 | 1/1971 | Schrenk et al. ................. 350/96.24 |
| 3,646,462 | 2/1972 | Snitzer ............................ 330/4.3 |
| 3,676,287 | 7/1972 | Flautt et al. .................. 428/392 X |
| 3,703,681 | 11/1972 | Johnson et al. ................... 324/43 R |
| 3,703,690 | 11/1972 | Ravenscroft et al. ........ 350/96.33 X |
| 3,732,425 | 5/1973 | Ellert et al. ....................... 250/217 S |
| 3,772,870 | 11/1973 | Wong et al. ................ 350/96.34 X |
| 3,785,716 | 1/1974 | Maurer ....................... 350/96.29 |
| 3,785,718 | 1/1974 | Gloge ........................ 350/96.31 |
| 3,806,224 | 4/1974 | Macchesney et al. ......... 350/96.34 X |
| 3,813,141 | 5/1974 | Miller ........................ 350/96.32 |
| 3,869,194 | 3/1975 | Shiraishi et al. .............. 350/96.34 |
| 3,928,687 | 12/1975 | Wada et al. ..................... 428/392 X |
| 3,997,241 | 12/1976 | Nishida et al. .................... 350/96.33 |

FOREIGN PATENT DOCUMENTS

| | | |
|---|---|---|
| 1572722 | 3/1970 | Fed. Rep. of Germany . |
| 1037498 | 7/1966 | United Kingdom . |
| 1143689 | 2/1969 | United Kingdom . |
| 1155795 | 6/1969 | United Kingdom . |
| 1152953 | 5/1969 | United Kingdom . |
| 1165865 | 10/1969 | United Kingdom . |
| 1371740 | 10/1974 | United Kingdom . |

OTHER PUBLICATIONS

Nakahara et al., "Optical Transmission Line," Japanese Published Patent Appl. No. 43642/1973, Jun. 1973.

*Primary Examiner*—John K. Corbin
*Assistant Examiner*—John D. Lee
*Attorney, Agent, or Firm*—Sughrue, Rothwell, Mion, Zinn and Macpeak

[57] ABSTRACT

An optical transmission fiber having improved mechanical strength and suitable for use in optical communication comprising an optical fiber having formed thereover at least one layer of a composition mainly comprising a thermoplastic resin having a functional group, and a method for making the optical transmission fiber.

15 Claims, 3 Drawing Figures

OPTICAL TRANSMISSION FIBER

This is a Continuation, of application Ser. No. 480,174, filed June 17, 1974 now abandoned.

BACKGROUND OF THE INVENTION

1. Field of the Invention

The present invention relates to an improved optical transmission fiber and, more particularly, it relates to a reinforced clad-type or composite-type transmission fiber which can be suitably used for optical communication. The invention further relates to a process of making such an optical transmission fiber.

2. Description of the Prior Art

As optical communication systems employed in the case of communicating using coherent light such as a laser, a beam guide system having focussing elements such as optical lenses or reflectors periodically disposed in space, a space transmission system, and a system using an optical fiber made of a light-transparent material such as, for example, glass, plastics, etc., are known. The optical transmission fiber of this invention belongs to the type used in the last system among the aforesaid three optical communication systems. Different from the transmission systems used as a light guide or a image guide, an optical communication is generally performed by pulse transmission and hence in the optical communication system a material which does not cause distortion of transmission waveform is required as the material for the transmission line.

BRIEF DESCRIPTION OF THE DRAWINGS

That is, FIG. 1 shows, respectively, cross sectional views and the refractive index distributions of an ordinary optical fiber (a), a clad-type multi-mode optical fiber (b), a clad-type single-mode optical fiber (c), an O-guide-type optical fiber (d), a self focussing-type optical fiber (e), and a single material-type optical fiber (f).

Figure 1:
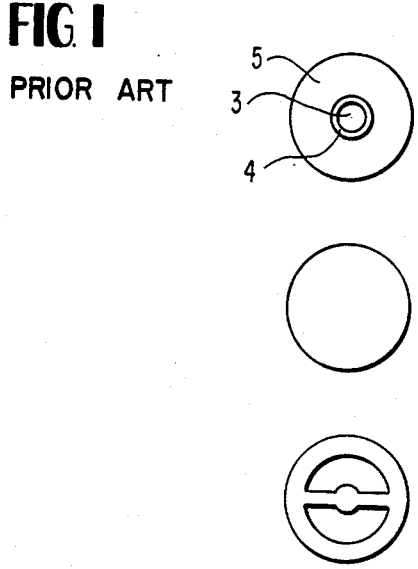
FIG. 1 illustrates optical fiber constructions of the prior art together with their refractive index distribution.

Optical fiber (a) is mainly used as a light guide or an image guide, but when such an optical fiber is used for an optical communication using coherent laser light, the wave surface of the transmitted light is unstable or unsettled and hence the pulse bandwidth widens gradually in the transmission of the optical pulse, which makes it difficult to transmit information correctly. Clad-type single-mode optical fiber (c) is composed of core 1 and clad 2 surrounding the core and if $n_1$ represents the refractive index of core 1 having a radius a and $n_2$ represents the refractive index of clad 2, then the following relationships are required:

$$n_1 > n_2 \quad (1)$$

$$2.45 \geq (2\pi a/\lambda)\sqrt{n_1^2 - n_2^2} \quad (2)$$

wherein $\lambda$ represents the wavelength of light.

In such a clad-type optical fiber, the light energy is transmitted through only core 1, that is, light passes through the core of the clad-type optical fiber while being totally reflected at the interface between core 1 and clad 2, and by reducing the diameter of core 1, the wave surface of the transmission light can be put in order.

Core 1 is usually made of a material having a refractive index a few percent higher than the refractive index of clad 2. Also, the diameters of core 1 and clad 2 of the clad type optical fiber are selected as follows. That is, when, for example, a YAG laser (the laser obtained using a crystal composed of yttrium, aluminum and garnet and with the crystal having been doped with trivalent neodynium, holmium or the like) having a wavelength of 1.06μ is employed as the light source, the diameter of core 1 must be about 3μ in order to satisfy the $HE_{11}$-mode single transmission condition and to keep the focussing extent of the transmission energy in core 1 higher than 40%. In this case, the diameter of clad 2 is selected to be about a few hundred microns, usually from about 200 microns to about 300 microns.

O-guide-type optical fiber (d) is composed of core 3, outer layer 5, both having a low refractive index, and intermediate layer 4 having a high refractive index disposed between the core 3 and the outer layer 5.

Self focussing-type optical fiber (e) has the refractive index distribution as shown in FIG. 1-(e), that is, this fiber acts as a kind of lens. Therefore, such an optical fiber can focus the light energy at the center of the core and thus is suitable for long distance transmission.

Examples of clad-type optical fibers (b) and (c) as illustrated in FIG. 1 are (1) an optical fiber wherein core 1 and clad 2 are made of glass, (2) an optical fiber wherein core 1 is made of a glass and clad 2 is made of a plastic, (3) an optical fiber wherein core 1 is made of a plastic and clad 2 is made of a glass, (4) an optical fiber wherein core 1 and clad 2 are made of plastic, (5) an optical fiber wherein core 1 is made of a liquid and clad 2 is made of a glass, and (6) wherein core 1 is made of a liquid and clad 2 is made of a plastic. Of these optical fibers as indicated above, optical fibers (1), (2), (5) and (6) in which at least core 1 is made of a glass or a liquid are preferable in the case of using the optical fiber for long distance optical communication since the plastics known at present are greatly inferior in transparency for light to the transparency for light of glass and a liquid. Furthermore, it is believed that optical fibers (1) and (5) are most preferred from the points of optical loss and practical use and in fact, the application of optical fibers for optical communication has been investigated mainly with respect to optical fiber types (1) and (5).

Also, in O-guide type optical fiber (d), core 3, intermediate layer 4, and outer layer 5 can be made of any materials such as glass, plastic, liquid, etc., if they satisfy the relation of refractive index shown in FIG. 1-(d) but by the same reasons as in the case of clad-type optical fibers, it is preferable that core 3 be made of a glass where the fiber is to be used for long distance optical communication and further it is most preferable in such a case that each of core 3, intermediate layer 4, and outer layer 5 be made of glass.

In the case of self focussing type optical fiber (e) as shown in FIG. 1, the optical fiber can be made of a glass or a plastic but for the same reasons as in clad-type optical fibers, it is also preferable that the fiber be made of a glass where the fiber is to be used for long distance optical communication. Also, among the glasses known at present, quartz glass is preferable from the point of optical loss.

However, an optical fiber composed of a glass only or a glass and a liquid can not be used as it is for practical purposes as an optical transmission line for the following reasons.

(A) Firstly, in the optical fiber made of a glass or of a glass and a liquid, the elongation until it is broken is quite less, the bending radius until break is quite large, and also it is quite low in strength to impact force and twisting. Furthermore, the tensile strength thereof can be quite high on the average but large deviations in the tensile strength exists and the minimum value of the tensile strength is quite low. Therefore, such an optical fiber has a large fault in that the fiber is, as a whole, very brittle, is poor in flexibility, and will be broken even by a slight deformation. Moreover, during the manufacturing of the optical fiber or in the course of handling the optical fiber thereafter, defects such as fine cracks are easily formed on the surface of the fiber and thus if an external force or deformation is applied to the defect-bearing portion, stress is concentrated upon the defect portion, which results in an acceleration of the tendency of the fiber to break. Accordingly, such an optical fiber is not resistant to the external force or deformation occurring during cable production using the optical fiber individually or by combining a plurality of optical fibers or during the laying the cable of the optical fiber or optical fibers and thus such an optical fiber cannot be used as it is for practical optical communication. Therefore, an optical communication system having excellent characteristics cannot be achieved with such an optical fiber. This is also substantially true for an optical fiber comprising an outermost glass layer or an optical fiber composed of a glass and a plastic.

(B) Secondly, the optical fiber used for optical communication must be very transparent, that is, the sources which cause absorption and scattering of light must be removed from the material as completely as possible. On the other hand, defects such as fine cracks formed on the surface of the optical fiber causes scattering of leaking light, which results in adverse influences to a large extent on the optical communication. The formation of defects such as cracks on the surface of the optical fiber is severe in the optical fiber wherein at least the outermost layer is made of a glass but such a difficulty can also occur in an optical fiber wherein at least the outermost layer is made of a plastic.

(C) Thirdly, if leaking light is totally reflected at the outermost surface of an optical fiber and returns to the central core or if light enters the central core from the outside, noise occurs in the optical communication and thus it is desired to prevent the leaking light from returning to the inside of the optical fiber as much as possible by leading the leaking light to the outside by some means or to prevent the entrance of external light as much as possible.

(D) Fourthly, in, for example, the aforesaid clad-type optical fiber, it is impossible to focus or concentrate the light energy completely in core 1 and the rest of the light energy enters clad 2. If core 1 is an ideally transparent body to light, no difficulties occur. However, usually impurities are present in core 1 or the interface between core 1 and clad 2 is uneven, even though the extent is slight, which causes scattering of light. Such scattered light causes light to leak. In using a single optical fiber, such difficulty can be avoidable by releasing the scattered light into surrounding space but in making a cable using a plurality of optical fibers, the scattered light enters the adjacent optical fibers and thus the scattered light must be trapped.

SUMMARY OF THE INVENTION

An object of this invention is to provide a reinforced optical transmission fiber which can be used as an optical transmission cable for practical purposes and which is not accompanied by any of the disadvantages (A), (B), (C) and (D) as described above.

Another object of this invention is to provide a process of making an excellent optical transmission fiber.

Still another object of this invention is to provide an optical transmission cable comprising one or a plurality of optical fibers as described above.

A further object of this invention is to provide an optical transmission system using the optical fiber or fibers as described above.

That is, according to the present invention, an optical transmission fiber is provided comprising an optical fiber having formed thereover at least one layer of a composition mainly comprising a thermoplastic resin having a functional group.

The aforesaid optical transmission fiber is produced according to the process of this invention, that is, for example, by extrusion-coating a molten composition mainly comprising a thermoplastic resin having a functional group on the surface of a core optical fiber.

According to another embodiment of this invention, an optical transmission cable is further provided comprising one or more optical fibers of this invention as described above surrounded or covered by an outer protective layer.

DETAILED DESCRIPTION OF THE INVENTION

As the results of research on overcoming the abovedescribed difficulties (A), (B), (C) and (D), it has been astonishingly discovered that these difficulties can be overcome by employing the optical transmission fiber or the optical transmission cable of this invention as described above, that is, by coating the surface of an optical fiber with a thermoplastic resin having a functional group in the molecule.

In the present invention the composition mainly comprising a thermoplastic resin having a functional group in the molecule is used as the material for the reinforcing layer of an optical fiber as described above because it has been confirmed as the results of various investigations that the reinforcement for an optical fiber for overcoming the aforesaid difficulties in conventional optical fibers can be industrially and economically realized using a thermoplastic resin having a functional group in the molecule. Extensive comparisons were made and in the interests of brevity and simplicity, the most pertinent results, i.e., a comparison of a composition mainly comprising a thermoplastic resin having a functional group as used in this invention with a composition mainly comprising a similar thermoplastic resin not having a functional group and a composition mainly comprising a thermosetting resin are set forth in detail and explained below.

Upon consideration it was believed that a thermosetting resin was a quite preferable material for reinforcing an optical fiber due to the high tensile strength, bending strength, and compressive elastic modulus of the thermosetting resin but, as the result of various investigations using such a thermosetting resin, it was confirmed that a thermosetting resin does not provide sufficient reinforcing effect, an optical fiber reinforced by such a resin does not show a great improvement in tensile strength, a thermosetting resin affects to a lesser extent improvements in the elongation percentage at break of the optical fiber, and also an optical fiber reinforced by such a thermosetting resin has poor flexibility and also has poor resistance to twisting.

On the other hand, although it might be considered that a thermoplastic resin would be unsuitable for reinforcement of an optical fiber due to the low tensile strength, bending strength, compressive elastic modulus of the thermoplastic resin as well as to its ready deformability by external force, it has been found as the results of investigations that when an optical fiber is reinforced or composited with a thermoplastic resin having a functional group in the molecule, a positive composite effect is obtained, that is, the optical fiber thus reinforced is remarkably improved in elongation percentage until break, tensile strength, bending strength, impact resistance, twist resistance, and the minimum value of the tensile strength and an optical transmission fiber which has high flexibility and which possesses sufficient deformation endurance in producing an optical transmission cable using the optical transmission fiber or fibers or in laying such an optical transmission cable is obtained.

Also, it has been confirmed that when a thermoplastic resin not having a functional group in the molecule is used for the reinforcement of an optical fiber, the adhesion between the surface of the optical fiber and the coating layer of the thermoplastic resin is quite inferior, an optical fiber reinforced by such thermoplastic resin is quite inferior in various properties such as elongation percentage until break, tensile strength, bending strength, and twisting resistance, that is, an optical fiber reinforced by the resin is quite inferior to an optical fiber reinforced by a thermoplastic resin having a functional group in the molecule and cannot be used for practical purposes.

In the course of the aforesaid investigations, it was found that in the case of reinforcing ordinary plastics, the important concern is the extent of the endurance of the reinforced plastics when an external force is applied to the plastics, while in the case of reinforcing an optical fiber, the important concern is the extent of the endurance of the reinforced optical fiber when not only an external force but also a deformation is applied to the fiber. Furthermore, it has also been confirmed that the excellent adhesivity of the thermoplastic resin having a functional group in the molecule to the surface of an optical fiber to be reinforced is also an important factor in the excellent mechanical and optical reinforcing effects achieved in this invention. In particular, it is also believed that when a thermoplastic resin having a functional group in the molecule thereof is employed for an optical fiber having a glass surface, the resin thus applied to the surface of the optical fiber has the effect of preventing the stress from being concentrated at the portions containing defects such as fine cracks, etc., on the surface of the optical fiber.

Figure 2A:
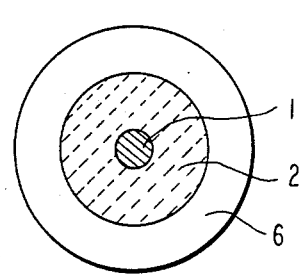
FIGS. 2 and 2a illustrate two embodiments of the optical transmission fibers of the present invention.
Figure 2B:
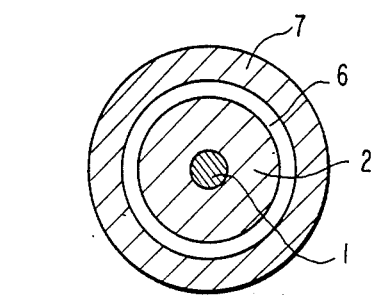

Moreover, by using a composition mainly comprising a thermoplastic resin having a functional group in the molecule, a resin composition having a refractive index which is the same as or higher than the refractive index of the surface portion of the optical fiber according to a specific embodiment of this invention, not only the difficulties (A) and (B) but also the difficulty (C), that is, the undesirable influences due to the reflection of light at the interface between the optical fiber and the resin composition layer formed thereover can be removed. That is, in the embodiments of the optical transmission fibers of this invention as illustrated in FIG. 2 of the accompanying drawings, the optical transmission fibers are composed of central core 1, clad 2 formed over the surface of core 1, and further layer 6 of a composition mainly comprising a thermoplastic resin having a functional group in the molecule formed directly on the surface of clad 2. Furthermore, the optical transmission fiber can have layer 7 or two or more such layers each having a composition which is the same as or different from that of layer 6 and formed on the surface of layer 6.

When in the aforesaid configuration, the composition of layer 6 mainly comprising a thermoplastic resin having a functional group in the molecule and the composition of clad 2 are so selected that the refractive index $n_6$ of layer 6 and the refractive index $n_2$ of clad 2 satisfy the following relationship;

$$n_6 \geqq n_2 \tag{4}$$

the reflection of the leaking light from clad 2 at the interface between clad 2 and layer 6 of the thermoplastic resin composition as described above is zero or is, if at all, a slight surface reflection only and the entrance of the incident light at the angles larger than the total reflection angle at the interface between clad 2 and layer 6 in light coming from the outside can be prevented by total reflection at the interface. In addition, when the refractive indices of the both compositions of the optical fiber satisfy the relation $n_6 < n_2$, the leaking light from clad 2 is totally reflected at the interface between clad 2 and layer 6 and then the reflected light enters core 1 again, which results in increasing the pulse width. Also, all of the light coming from the outside enters clad 2 from layer 6. The above explanation is for clad-type optical fibers but is also applicable to other types of optical fibers.

Also, by using the composition mainly comprising a thermoplastic resin having a functional group in the molecule, which has the function of absorbing light of all wavelengths or selectively absorbing light of the wavelengths to be used for the optical transmission according to another specific embodiment of this invention, not only the difficulties (A) and (B) but also the difficulty (D), that is, the entrance of leaking light from an optical fiber to other adjacent optical fibers in an optical transmission cable composed of a plurality of optical fibers or the entrance of light from the outside to the optical fiber can be prevented.

The above technique can be attained by incorporating carbon black or another appropriate pigment or dye in the resin composition.

Furthermore, by using as the composition of layer 6 a composition mainly comprising a thermoplastic resin having a functional group, said composition having the light absorption characteristics as stated above and satisfying the refractive index relation $n_6 \geqq n_2$, all of the difficulties (A), (B), (C) and (D) can be eliminated and thus it is most preferable to employ a thermoplastic resin composition satisfying both of the conditions as stated above.

Then, the optical transmission fiber of this invention comprising an optical fiber and a layer of the composition mainly comprising a thermoplastic resin having a functional group can be prepared using any one of the following processes (1) to (4):

(1) As in the case of producing coated wires, a solution or a dispersion of the resin composition in a solvent can be coated on the surface of an optical fiber followed by baking.

(2) An optical fiber can be preheated and a resin composition powder is adhered to the surface of the preheated optical fiber to melt the resin composition on the surface of the fiber, or an optical fiber having a resin composition powder adhered thereto is further heated to a temperature higher than the melting point of the resin composition to melt the resin composition.

(3) As in the case of conducting the vapor phase reaction of polyparaxylylene, polytetrafluoroethylene, etc., an optical fiber can be placed in an atmosphere of a gaseous monomer having a functional group under reactive conditions, whereby a film of the thermoplastic polymer is formed directly on the surface of the optical fiber.

(4) A composition of a thermoplastic resin having a functional group in the molecule can be melted and the molten resin composition is extrusion-coated on the surface of an optical fiber using a screw type extruder, fiber coating within the die head, fiber coating outside the die head (including suction), a gear pump type extruder, or the like.

Of the processes as described above, in process (1) the resin composition must be dissolved or dispersed in a medium or solvent and hence the kind of the resin composition is limited to a resin composition capable of being dissolved or dispersed in a solvent. Furthermore, in process (1), the thickness of coating obtained in one coating step is usually limited to about a few microns to prevent difficulties such as blistering from occurring. Therefore, if a coating of, for example, 500 microns thick is required, coating and baking steps must be repeated several tens of times and hence the coating steps become complicated and also require a large installation. Also, since process (1) requires repetitions of the coating and baking steps several tens of times as described above, the optical fiber tends to undergo large tension, twisting, and bending stresses as well as an impact force, which results in causing, as the case may be, a breakage of the optical fiber or fine cracks on the surface of the optical fiber. However, even with process (1), the desired optical transmission fiber of this invention can be produced by improving the precision of the equipment used in the production.

An optical fiber ordinarily used has a diameter below several hundreds of microns. That is, since the optical fiber is generally very fine, in process (2), the heat energy of the heating temperature usually used for powder coating is insufficient for adhering the resin powder to the surface of the optical fiber and melting the powder on the fiber and thus to effectively conduct coating using process (2) the heat energy must be increased by heating the optical fiber at quite a high temperature, which frequently makes employment of the process difficult from a practical standpoint.

Process (3) involves less difficulties than in process (1) and process (2) but the kind of monomers to which such a process is applicable is limited to very few kinds and further quite a long period of time is required to form a film of the polymer having a desired thickness. That is, the efficiency of process (3) is also low although the process can be employed for specific kinds of monomers.

In process (4), the resin composition can be heated to a temperature higher than the melting point of the resin composition and a coating of a desired thickness can be formed in only one coating step. Also, multilayer coating can be obtained using the same number of coating steps as the number of the layers desired. Thus, in process (4), the damage or the occurrence of defects in the optical fiber at coating can be minimized. Furthermore, in process (4), less restrictions exist on the resin composition, such as the solubility or dispersibility of the resin composition in solvent as in process (1) and the possibility of forming powder as in process (2). That is, resin compositions which can be melted by heating and are fluid at the temperature until coating can be used.

For the reasons as described above, of the four processes described above, process (4) is the most suitable for producing an optical transmission fiber composed of an optical fiber having formed thereover a layer of a composition mainly comprising the thermoplastic resin having a functional group in the molecule among the aforesaid four processes. Process (1) is the next most suitable process which can be used.

The composition mainly comprising a thermoplastic resin having a functional group in the molecule used in this invention can further contain, if desired, additives such as a thermoplastic resin having no functional group, a resinous additive, an inorganic filler, an organic filler, a pigment, a dye, etc.

Examples of suitable thermoplastic resins having a functional group in the molecule include polyamides, polyesters, polycarbonates, polyurethanes, polyureas, polyimides, polyhydantoins, polysulfones, polyethers, polyesterimides, polyvinyl acetals, polyacrylic acid esters, ionomer resins, ethylene-vinyl acetate copolymers, urethane rubbers, chlorosulfonated polyethylene ethylene-acrylic acid copolymers, acrylate rubbers, etc.

Examples of suitable polyamides are, for example, 6,6-nylon, 6-nylon, 11-nylon, 12-nylon, 6,10-nylon, nylon copolymers, etc. Also, examples of suitable polyesters are, for example, polyethylene terephthalate, polybutylene terephthalate, polyhexamethylene terephthalate, polyethylene terephthalate-isophthalate copolymers, poly-1,4-cyclohexane dicarbonylterephthalate, polycyclohexylene dimethylene terephthalate-isophthalate copolymers, polyethylene naphthalate, etc.

Examples of suitable polyethers are, for example, a PPO resin (the trade name of a polyphenylene oxide produced by the General Electric Co.), a Noryl resin (the trade name of a modified polyphenylene oxide produced by the General Electric Co.) a phenoxy resin produced by Union Carbide Corp., etc. Also, examples of suitable polysulfones are, for example, Polysulfones P 1700, P 1710, P 1720, P 3500, and P 3510 (trade names, produced by Union Carbide Corp.), Ucardel P 4174 (a trade name of a modified polysulfone produced by Union Carbide Corp.), Polymer 360 (a trade name, produced by Minnesota Mining & Mfg. Co.), Polyethersulfones 200P and 300P (trade names, produced by JIC Co., in the United Kingdom), etc. Examples of suitable ionomer resins are Sarlyn produced by E. I. du Pont de Nemours & Co., etc. Other examples of the thermoplastic resins are Dumilan (a trade name of the modification polymer of an ethylene-vinyl acetate copolymer produced by Mitsui Polychemical Co.) and Dexon (the trade name of a polyolefinic copolymer made by Exon Co.).

Of these polymers or copolymers, the most preferable materials are polyamides and polyesters and then polyethers, polysulfones, ionomer resins, and ethylene-vinyl acetate copolymers follow.

Examples of this invention using polyamides are illustrated in Examples 1, 6, 7, 8, 9 and 11 and as shown in the examples, when a polyamide was used, optical transmission fibers having excellent mechanical properties such as elongation, tensile strength to break, toughness, and flexibility as well as being readily colorable using a dye, pigment, or a filler can be obtained. Also, since the friction coefficient of a polyamide is quite low in making an optical transmission fiber using a combination of a plurality of optical fibers each coated with the polyamide, the optical fibers thus coated with the polyamide show good slip characteristics with respect to other in the case of assembling the cable and thus there is less difficulty in breakage of the optical fibers in producing such an optical cable. In other words, in such a case, an optical transmission fiber having quite excellent properties can be obtained and the product is very excellent as compared with the case of using thermoplastic resins having a functional group in the molecule other than the polyamide.

Examples of using polyesters are illustrated in Examples 2 and 5. When a polyester is used as the thermoplastic resin having a functional group in the molecule as shown in the examples, an optical transmission fiber which is superior in flexibility and not greatly inferior in the friction coefficient to the case of using a polyamide is obtained and in addition possesses the excellent properties of the optical transmission fiber obtained using a polyamide.

Examples of ionomer resins and ethylene-vinyl acetate copolymers are illustrated in Examples 3 and 4. In these cases, the optical transmission fibers thus obtained may be slightly inferior in break resistance and elongation percentage to the cases of using a polyamide and a polyester as the thermoplastic resin but are quite excellent in flexibility and minimum bending radius.

It is believed that the improvement of the properties of the optical fibers obtained using the polyamides, polyesters, ionomer resins, ethylene-vinyl acetate copolymers, etc., as the thermoplastic resin having a functional group in the molecule, which is the main component of the resin composition depends partially upon the improvement in adhesivity of the resin and the surface of the glass due to the presence of the functional group contained in the resin and the use of the aforesaid resins results in great differences in the properties obtained from the case of using a resin not having such a functional group, such as polyethylene, polypropylene, tetrafluoroethylene-hexafluoropropylene copolymers, polychlorotrifluoroethylene, etc.

Furthermore, the refractive index of each of the polyamides, polyesters, ionomer resins, ethylene-vinyl acetate resins, etc., used in this invention as the thermoplastic resin is higher than the refractive index (about 1.46) of quartz glass and thus the aforesaid difficulty (C) can be overcome by employing such a thermoplastic resin.

As described before, the difficulty (D) set forth above can be overcome by adding, for example, carbon black to the resin composition as a component or adding an additive capable of selectively absorbing the light of the wavelength to be used for optical communication, such as a pigment, a dye, an organic or inorganic filler, a resin, etc., to the resin composition.

The wavelength of light used for optical communication at present is about 1.06 microns in the case of using a YAG laser as the light source and about 0.85 microns in the case of using a GaAs type semiconductor laser as the light source or light emitter. On the other hand, in the case of using a polyamide as the main component of the resin composition used for the coating layer of the optical fiber, the polyamide has, in addition to absorptions of the second overtone and the third overtone of the carbon-hydrogen group near 1.1 microns and 0.85 microns, absorption of the second overtone of the nitrogen-hydrogen group near 0.95 microns and the fifth overtone of the carbonyl group near 1.0 micron. Since they are overtones, the absorptions are not always large but less leaking of light occurs. Therefore, the coating layer composed of the polyamide contributes to the absorption of light having the wavelength used for light transmission. Thus, as a result of such, it will be understood that polyamides are excellent in this invention. Also, it will be understood that polyesters, ethylene-vinylacetate copolymers, ionomer resins, etc., contain a carbonyl group and hence these resins also act as the light absorbing layer as in the case of polyamides to some extent.

Furthermore, it has also been discovered that when an optical fiber is coated with a molten resin composition mainly comprising a thermoplastic resin having a functional group in the molecule by extrusion, crystallization of the resin can be prevented and the glassy state of the resin can be maintained, whereby the elongation percentage and the flexibility of the optical transmission fiber thus obtained can be greatly improved. This can be performed by quenching the optical fiber directly after coating to temperatures below room temperature using water, an appropriate liquid, or a gas at low temperature. This procedure is particularly effective when the highly crystalline resin having the glass transition temperature higher than room temperature is employed. For example, the aforesaid case is illustrated in Example 11 in which an optical fiber was coated with 12-nylon by extrusion as in Example 1 and cooled in air slowly. That is, the example demonstrates that the optical fiber thus coated had a white-turbid appearance, was high in elasticity but was curled slightly in the course of the production thereof. On comparing the tensile strength experimental data in Table 1 between Example 1 and Example 11, it will be understood that the optical transmission fiber obtained in Example 1 had superior characteristics, in particular was superior in elongation percentage and flexibility of the coated fiber.

As described above, in the case of an optical transmission cable made of a material having a high elasticity but extremely poor flexibility, such as glass fibers, it is more important that the cable be able to resist the extent of deformation than to resist the extent of the outer force. From this point of view, it is particularly effective in the production of such an optical transmission fiber to quench the coated molten resin composition directly after coating. As in the case of using 12-nylon as the thermoplastic resin, the optical transmission fiber can be greatly improved in flexibility as well as in tensile strength by preventing the crystallization of the resin by quenching because the resin is maintained in a glassy condition by quenching. Hence the flexibility of the resin itself increases and also the adhesivity of the resin and the glass at the interface thereof becomes better, which results in improving the characteristics of the optical transmission fiber as the composite.

It has further been found that when an optical fiber, in particular, an optical fiber made of glass is coated by melt extrusion with a composition mainly comprising a thermoplastic resin having a functional group in the molecule, the adhesivity between the optical fiber and the resin composition can be improved by preheating the optical fiber to temperatures the same as or higher than the temperature of the molten resin composition. While not desiring to be bound, the reason is believed to be as follows. First, if the optical fiber is cold when brought into contact with the molten resin composition, the molten resin thermally shrinks resulting in less adhesivity of the two components at the interface and second, any foreign matter which might be attached to the surface of the optical fiber is volatillized off by the heat to provide a clean surface.

Moreover, when the outermost layer or surface of an optical fiber is made of glass, the adhesivity between the optical fiber and a composition mainly comprising the thermoplastic resin having a functional group in the molecule can be improved by treating the surface of the optical fiber, prior to the production of the optical transmission fiber of this invention, with hydrofluoric acid or a silane coupling agent such as γ-glycidoxypropyl trimethoxysilane, γ-aminopropyltriethoxysilane, etc., or further with methacrylate chromium chloride (such as Boran, trade name) or a tetraalkyltitanate. The optical transmission fibers prepared after applying such a surface treatment are also included in the scope of the present invention.

Examples of inorganic or organic fillers which can be used are, for example, powders of $TiO_2$, MnO, ZnO, $Al_2O_3$, $SiO_2$, $Al(OH)_3$, carbon, etc. In addition, in making an optical transmission cable using a plurality of optical transmission fibers, frequently each optical transmission fiber must be colored for discriminating the optical transmission fibers each other. This can be achieved by, for example, incorporating a pigment, a dye, a colored filler, etc., in the layer of the composition of the thermoplastic resin having a functional group in the molecule of the optical transmission fiber in the case of a single layer-type optical transmission fiber or in at least one of the layers including the layer or layers of the composition of the thermoplastic resin having a functional group in the case of multilayer type optical transmission fiber. As other methods of coloring the optical transmission fiber, the surface of the optical fiber may be dyed by a dye, coated with a coating composition containing a colorant, or a colored resin composition, such as a composition of a thermoplastic resin not having a functional group or a thermosetting resin.

Furthermore, an optical transmission cable composed of one or more optical transmission fibers of this invention can contain, if desired, a feeder, an inspection wire, a reinforcing line, an emergency communication line, etc.

In the following examples, the break load and the elongation percentage were measured using an Instron tensile testing machine (made by Instron Co., U.S.A.) at a distance of 40 mm between the chucks and a tension speed of 5 mm/min. The minimum bending radius was the value obtained on measurement in a tension free state.

The break load, the elongation percentage, and the minimum bending radius were the values when an optical fiber and the layer of a composition of the thermoplastic resin having a functional group in the molecule formed on the optical fiber were broken at the same time or one of them was broken first. In general, however, the optical fiber only was broken or both of the optical fiber and the layer of the resin composition were broken at the same time.

EXAMPLE 1

A preheated clad-type optical fiber of quartz glass having a diameter of 200μ was coated by extrusion (under a reduced pressure outside the die head) with 12-nylon (made by Huls A. G., Germany) and then immediately cooled with water to provide an optical transmission fiber of this invention. The coated layer of 12-nylon was colorless and transparent. The optical transmission fiber thus obtained was quite flexible and could be handled easily.

The tensile characteristics and the minimum bending radius of the optical transmission fiber were measured and the values obtained are shown in Table 1.

EXAMPLE 2

A preheated clad type optical fiber of quartz glass having a diameter of 200μ was coated by extrusion with a polybutylene terephthalate resin (a polyester resin, made by Toray Co.) and then immediately cooled with water to provide an optical transmission fiber of this invention. The layer of the polybutylene terephthalate resin was transparent.

The tensile characteristics and the minimum bending radius of the optical transmission fiber were measured and the results obtained are shown in Table 1.

EXAMPLE 3

A preheated clad type optical fiber of quartz glass having a diameter of 200μ was coated by extrusion (fiber coating outside the die head, under a reduced pressure) with Sarlyn #1652 (the trade name of an ionomer resin made by E. I. du Pont de Nemours & Co.) and then immediately cooled with water to provide an optical transmission fiber of this invention. The layer of Sarlyn was colorless and transparent. The optical transmission fiber was quite flexible and could be handled easily.

The tensile characteristics and the minimum bending radius of the optical transmission fiber were measured, the results obtained being shown in Table 1.

EXAMPLE 4

A preheated clad type optical fiber of quartz glass having a diameter of 200μ was coated by extrusion (fiber coating outside the die head, under a reduced pressure) with Evatate (the trade name of an ethylene-vinyl acetate copolymer resin made by Sumitomo Chemical Industries Co.) and then immediately cooled with water to provide an optical transmission fiber of this invention. The optical transmission fiber thus obtained was quite flexible and could be handled easily.

The tensile characteristics and the minimum bending radius of the optical transmission fiber were measured, the results being shown in Table 1.

EXAMPLE 5

A clad type optical fiber of quartz glass having a diameter of 200μ was coated through a die with molten Tenite 7 DR OF (the trade name of a polycyclohexylenedimethylene terephthalate-isophthalate copolymer resin made by Eastman Chemical Products Inc.) and then immediately cooled with water to provide an optical transmission fiber of this invention. The tensile characteristics of the optical transmission fiber thus obtained are shown in Table 1.

EXAMPLE 6

A preheated clad type quartz glass optical fiber having a diameter of 200μ was coated by extrusion (fiber coating outside the die head, under a reduced pressure) with Amilan CM 2001 (the trade name of 610-nylon made by Toray Co.) and then immediately cooled with water to provide an optical transmission fiber of this invention. The layer of the 610-nylon thus formed was colorless and transparent. The optical transmission fiber was quite flexible and could be handled easily. The tensile characteristics of the optical transmission fiber were measured, the results being shown in Table 1.

EXAMPLE 7

A preheated quartz glass clad type optical fiber having a diameter of 200μ coated by extrusion (fiber coating outside the die head, under a reduced pressure) with 11-nylon (made by Aquitaine Organico S. A., France) and then immediately cooled with water to provide an optical transmission fiber of this invention. The coated layer of 11-nylon was colorless and transparent. The optical transmission fiber thus obtained was quite flexible and could be handled easily.

The tensile characteristics and the minimum bending radius of the optical transmission fiber were measured, the results being shown in Table 1.

EXAMPLE 8

A quartz glass clad type optical fiber having a diameter of 200μ was coated with a methacresol solution of 25% 12-nylon (made by Huls A. G., Germany) followed by baking to provide an optical transmission fiber of this invention. The above baking treatment was conducted at an oven length of 1.2 meters, a line velocity of 0.55 meters/min., and an oven temperature of 250° C. By repeating these coating and baking treatments ten times, an optical transmission fiber having a diameter of 456μ was obtained.

The tensile characteristics and the minimum bending radius of the optical transmission fiber thus obtained were measured, the results being shown in Table 1.

EXAMPLE 9

A quartz tubular clad type optical fiber having a diameter of 220μ (a liquid-filling clad type optical fiber) was coated through a die with molten 12-nylon (made by Huls A. G., Germany) and then immediately cooled with water to provide an optical transmission fiber of this invention. The coated layer of 12-nylon was colorless and transparent. The optical transmission fiber thus prepared was quite flexible and could be handled easily. The tensile characteristics of the optical transmission fiber are shown in Table 1.

EXAMPLE 10

Optical transmission fibers (easily distinguishable) were prepared in the same manner as described in Example 1 using colored 12-nylon and 610-nylon (Amilan, produced by Toray Co.). The optical transmission fibers thus prepared and the optical transmission fiber coated with 12-nylon prepared in Example 1 (seven fibers in total) were twisted and the outer side of the combination or assembly was covered with a Lumirror (a trade name, produced by Toray Co.), tape to provide an optical fiber unit. Then, six such units were twisted with a service wire at the center. The outer side of the assembly of the units was covered longitudinally with an embossed tape, covered by a Lumirror tape, wound further with an aluminum tape, and finally coated by extrusion with a black polyvinyl chloride compound to provide an optical transmission cable.

EXAMPLE 11

A preheated quartz glass clad type optical fiber having a diameter of 200μ, which was prepared from the same batch used for making the clad type optical fiber used in Example 1, was coated by extrusion (fiber coating outside the die head, under a reduced pressure) with 12-nylon and allowed to cool in air to provide an optical transmission fiber of this invention. The coated layer of 12-nylon had a slightly white turbid appearance. The optical transmission fiber thus obtained was higher in elasticity but lower in flexibility than the optical transmission fiber obtained in Example 1. The tensile characteristics of the optical transmission fiber are also shown in Table 1.

COMPARISON EXAMPLE 1

The tensile characteristics and the minimum bending radius of the quartz glass clad type optical fiber used as the core in Examples 1 to 9 described above and Comaprison Examples 2, 3, and 5 shown below were measured, the results being shown in Table 2.

COMPARISON EXAMPLE 2

A quartz glass clad type optical fiber having a diameter of 200μ was coated with Sumilite resin PR-961A (the trade name of a phenol resin produced by Sumitomo Durez Co.) followed by baking to provide a comparison optical transmission fiber. The above baking treatment was conducted at an oven length of 2.2 meters, a line velocity of 1.0 meter/min., and an oven temperature of 190° C. and the coating and baking treatment was repeated ten times.

The optical transmission fiber was high in elasticity and poor in flexibility and it would be difficult to make a cable by combining a plurality of such optical transmission fibers. The tensile characteristics of the optical transmission fiber are shown in Table 2.

COMPARISON EXAMPLE 3

A quartz glass clad type optical fiber having a diameter of 200μ was coated with a coating composition prepared by adding to Polylite 8010 (the trade name of an unsaturated polyester resin produced by Dai-Nippon Ink Co.) 20% styrene monomer and 1% t-butyl perbenzoate as a hardening agent followed by baking to provide a comparison optical transmission fiber.

The above baking treatment was conducted at an oven length of 2.2 meters, a line velocity of 0.85 meters/min., and an oven temperature of 140° C. and the coating and baking treatment was repeated eight times.

The optical transmission fiber obtained was high in elasticity and poor in flexibility and it would be difficult to make a cable by combining a plurality of such optical transmission fibers. The tensile characteristics of the optical transmission fiber are shown in Table 2.

COMPARISON EXAMPLE 4

The tensile characteristics and the minimum bending radius of the quartz glass tubular clad type optical fiber (a liquid-filling clad type glass fiber) used as the core in Example 9 were measured, the results being shown in Table 2.

COMPARISON EXAMPLE 5

A quartz clad type optical fiber having a diameter of 200μ was coated by extrusion with Sumikathene (the trade name of polyethylene made by Sumitomo Chemical Industries Co.) and then immediately cooled with water to provide a comparison optical transmission fiber. The coated layer of the optical transmission fiber was opaque to some extent. The tensile characteristics of the optical transmission fiber are shown in Table 2.

TABLE 1

| Example | Outer Diameter (μ) | Break Load (kg) | Elongation Percentage (%) | Minimum Bending Radius (mm) |
|---|---|---|---|---|
| 1 | 600 | 5.53 | 2.8 | 5.5 |
| 2 | 535 | 4.02 | 2.2 | 6.0 |
| 3 | 645 | 2.86 | 1.7 | 4.0 |
| 4 | 650 | 3.11 | 1.9 | 5.0 |
| 5 | 512 | 3.11 | 1.7 | |
| 6 | 605 | 4.81 | 2.5 | 6.0 |
| 7 | 610 | 4.93 | 2.6 | 5.5 |
| 8 | 456 | 4.70 | 1.7 | 9.0 |
| 9 | 505 | 4.86 | 2.6 | |
| 11 | 600 | 4.40 | 1.9 | |

TABLE 2

| Comparison Example | Outer Diameter (μ) | Break Load (kg) | Elongation Percentage (%) | Minimum Bending Radius (mm) |
|---|---|---|---|---|
| 1 | 200 | 0.84 | 0.64 | 25 |
| 2 | 500 | 2.54 | 1.10 | |
| 3 | 470 | 1.99 | 1.00 | |
| 4 | 220 | 0.80 | 0.48 | 27 |
| 5 | 1000 | 0.93 | 0.74 | |

While the invention has been described in detail and with reference to specific embodiments thereof, it will be apparent to one skilled in the art that various changes and modifications can be made therein without departing from the spirit and scope thereof.

What is claimed is:

1. An optical transmission fiber comprising (1) an optical fiber which comprises a core layer having a clad layer thereover, said clad layer having a lower refractive index than said core layer, and (2) over said optical fiber at least one layer of a composition mainly comprising a thermoplastic resin selected from the group consisting of a polyamide resin, an ethylene-vinyl acetate copolymer, an ethylene-acrylic acid copolymer and an ionomer resin, wherein said thermoplastic resin has a refractive index at least equal to the refractive index of the clad of said optical fiber.

2. The optical transmission fiber as claimed in claim 1, wherein said thermoplastic resin is a polyamide resin.

3. The optical transmission fiber as claimed in claim 1, wherein said thermoplastic resin is selected from the group consisting of an ethylene-vinyl acetate copolymer, an ethylene-acrylic acid copolymer and an ionomer resin.

4. The optical transmission fiber as claimed in claim 1, wherein said resin composition absorbs light of all wavelengths.

5. The optical transmission fiber as claimed in claim 1, wherein said resin composition absorbs only the light used for optical communication.

6. An optical transmission fiber comprising (1) an optical fiber of the self-focussing type wherein the refractive index varies continuously from a maximum at the center to a minimum at the periphery of said fiber and (2) over said optical fiber at least one layer of a composition mainly comprising a thermoplastic resin selected from the group consisting of a polyamide resin, an ethylene-vinyl acetate copolymer, an ethylene-acrylic acid copolymer and an ionomer resin, wherein said thermoplastic resin has a refractive index at least equal to the refractive index of the periphery of said optical fiber.

7. The optical transmission fiber as claimed in claim 6, wherein said thermoplastic resin is a polyamide resin.

8. The optical transmission fiber as claimed in claim 6, wherein said thermoplastic resin is selected from the group consisting of an ethylene-vinyl-acetate copolymer, an ethylene-acrylic acid copolymer and an ionomer resin.

9. The optical transmission fiber as claimed in claim 6, wherein said thermoplastic resin absorbs light of all wavelengths.

10. The optical transmission fiber as claimed in claim 6, wherein said thermoplastic resin absorbs only light used for optical communications.

11. An optical transmission fiber comprising (1) an optical fiber of the single material bar and pipe type wherein the refractive index of the air space between the bar and pipe is less than that of the bar and pipe and (2) over said optical fiber at least one layer of a composition mainly comprising a thermoplastic resin selected from the group consisting of a polyamide resin, an ethylene-vinyl acetate copolymer, an ethylene-acrylic acid copolymer and an ionomer resin, wherein said thermoplastic resin has a refractive index at least equal to the refractive index of said pipe.

12. The optical transmission fiber as claimed in claim 11, wherein said thermoplastic resin is a polyamide resin.

13. The optical transmission fiber as claimed in claim 11, wherein said thermoplastic resin is selected from the group consisting of an ethylene-vinyl acetate copolymer, an ethylene-acrylic acid copolymer and an ionomer resin.

14. The optical transmission fiber as claimed in claim 11, wherein said thermoplastic resin absorbs light of all wavelengths.

15. The optical transmission fiber as claimed in claim 11, wherein said thermoplastic resin absorbs only light used for optical communications.

* * * * *